US009182240B2

(12) United States Patent
Poornachandran et al.

(10) Patent No.: US 9,182,240 B2
(45) Date of Patent: Nov. 10, 2015

(54) METHOD, APPARATUS AND SYSTEM FOR MAPPING A COURSE OF A MOBILE DEVICE

(71) Applicant: Intel Corporation, Santa Clara, CA (US)

(72) Inventors: Rajesh Poornachandran, Beaverton, OR (US); Uttam Sengupta, Portland, OR (US); Rajasekaran Andiappan, Tampere (FI)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 13/627,950

(22) Filed: Sep. 26, 2012

(65) Prior Publication Data

US 2014/0088860 A1    Mar. 27, 2014

(51) Int. Cl.
*G01C 21/16* (2006.01)
*G01C 21/20* (2006.01)
*G01S 7/484* (2006.01)

(52) U.S. Cl.
CPC ............ *G01C 21/206* (2013.01); *G01C 21/16* (2013.01)

(58) Field of Classification Search
CPC .. G01C 21/20; G01C 21/3617; G01C 22/006; G01C 21/3484; G01C 21/16; G01C 21/206; A63B 57/00; A63B 71/0669; G06Q 30/02; G06Q 20/20; A61B 18/1815; H04W 64/003; G06F 21/35; G01N 1/00; G01L 15/30; G01S 7/484
USPC ........... 701/410, 454, 532; 702/141; 473/407; 342/458; 726/5; 340/901; 705/14.58; 704/231; 250/206.1
See application file for complete search history.

(56) References Cited

U.S. PATENT DOCUMENTS

| | | | |
|---|---|---|---|
| 6,845,318 B1 * | 1/2005 | Moore et al. .................. | 701/454 |
| 7,118,498 B2 * | 10/2006 | Meadows et al. ............. | 473/407 |
| 2002/0059066 A1 * | 5/2002 | O'Hagan ...................... | 704/231 |
| 2009/0043504 A1 | 2/2009 | Bandyopadhyay et al. | |
| 2010/0057337 A1 * | 3/2010 | Fuchs ........................... | 701/200 |

(Continued)

FOREIGN PATENT DOCUMENTS

WO    WO-2012049492    4/2012

OTHER PUBLICATIONS

"PCT, International Search Report and the Written Opinion of the International Searching Authority for International Application No. PCT/US2013/056619", (Dec. 5, 2013), Whole Document.

(Continued)

*Primary Examiner* — Tuan C. To
*Assistant Examiner* — Yuri Kan
(74) *Attorney, Agent, or Firm* — Blakely, Sokoloff, Taylor & Zafman LLP

(57) ABSTRACT

Techniques and mechanisms for providing information to represent a course traversed by a mobile device. In an embodiment, navigation logic of the mobile device determines context data other than any geodetic data that specifies a position of the mobile device. With such context data, the navigation logic determines a sequence of estimates each for a respective position of the device on a course traversed by the mobile device. In another embodiment, determining the sequence of estimates includes determining a first estimate of a first position of the mobile device independent of any geodetic data that specifies the first position. Course information representing such a determined sequence includes timestamp information for the first estimate.

26 Claims, 9 Drawing Sheets

(56) References Cited

U.S. PATENT DOCUMENTS

| | | | |
|---|---|---|---|
| 2011/0006190 A1* | 1/2011 | Alameh et al. | 250/206.1 |
| 2011/0028132 A1 | 2/2011 | Bos | |
| 2011/0095946 A1* | 4/2011 | Castillo | 342/458 |
| 2011/0163892 A1* | 7/2011 | Groves et al. | 340/901 |
| 2012/0144458 A1* | 6/2012 | Mechaley, Jr. | 726/5 |
| 2012/0166077 A1 | 6/2012 | Herzog et al. | |
| 2012/0203453 A1 | 8/2012 | Lundquist et al. | |
| 2012/0316963 A1* | 12/2012 | Moshfeghi | 705/14.58 |
| 2013/0231889 A1* | 9/2013 | Hrybyk et al. | 702/141 |
| 2013/0335273 A1* | 12/2013 | Pakzad et al. | 342/458 |
| 2013/0345961 A1* | 12/2013 | Leader et al. | 701/410 |

OTHER PUBLICATIONS

International Preliminary Report on Patentability from PCT/US2013/056619 mailed Apr. 9, 2015, 8 pgs.

* cited by examiner

METHOD, APPARATUS AND SYSTEM FOR MAPPING A COURSE OF A MOBILE DEVICE

BACKGROUND

1. Technical Field

Embodiments of the invention relate generally to navigation systems. Certain embodiments more particularly relate to techniques for representing a traversed course in a displayed map.

2. Background Art

Existing mobile devices provide navigation functionality to variously identify a current device position, to receive input from a user which specifies a desired destination, and to display to the user a map showing a proposed route from the current position to the desired destination. A mobile device's navigation system typically receives Global Positioning System (GPS) information as a user navigates toward such a desired destination. Based on such GPS information, the navigation system updates map information describing the current device position and/or the recommended route to the desired destination. Typically, the recommended route is comprised of one or more predetermined component routes along various roads, highways, bikepaths, walkways and/or the like.

However, such functionality of existing navigation systems is of little or no use in certain everyday situations for users of mobile devices. For example, people visiting large or complex buildings (e.g. shopping malls, convention centers, hospitals, etc.) quite often find it difficult to remember a course by which they came into the building and/or a course taken within the building during some period of time. Moreover, such courses are often arbitrary—e.g. where the user does not plan the course prior to or even during traversal—and do not follow any particular predetermined route (or predetermined component route) along a road, walkway, etc. Furthermore, people navigating in such a building often find that, in hindsight, they would like to return to some mid-course position or region which they cannot remember or clearly specify. For example, people navigating in a mall or other such building often misplace personal belongings (such as umbrellas, purses, etc.) and need to retrace their course since they do not remember when or where they lost their belongings. Further still, while a user of a mobile device navigates in such a building, the mobile device often has inconsistent or non-existent access to GPS signals.

Current navigation and mapping techniques fail to address various problems posed by situations such as those described above.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
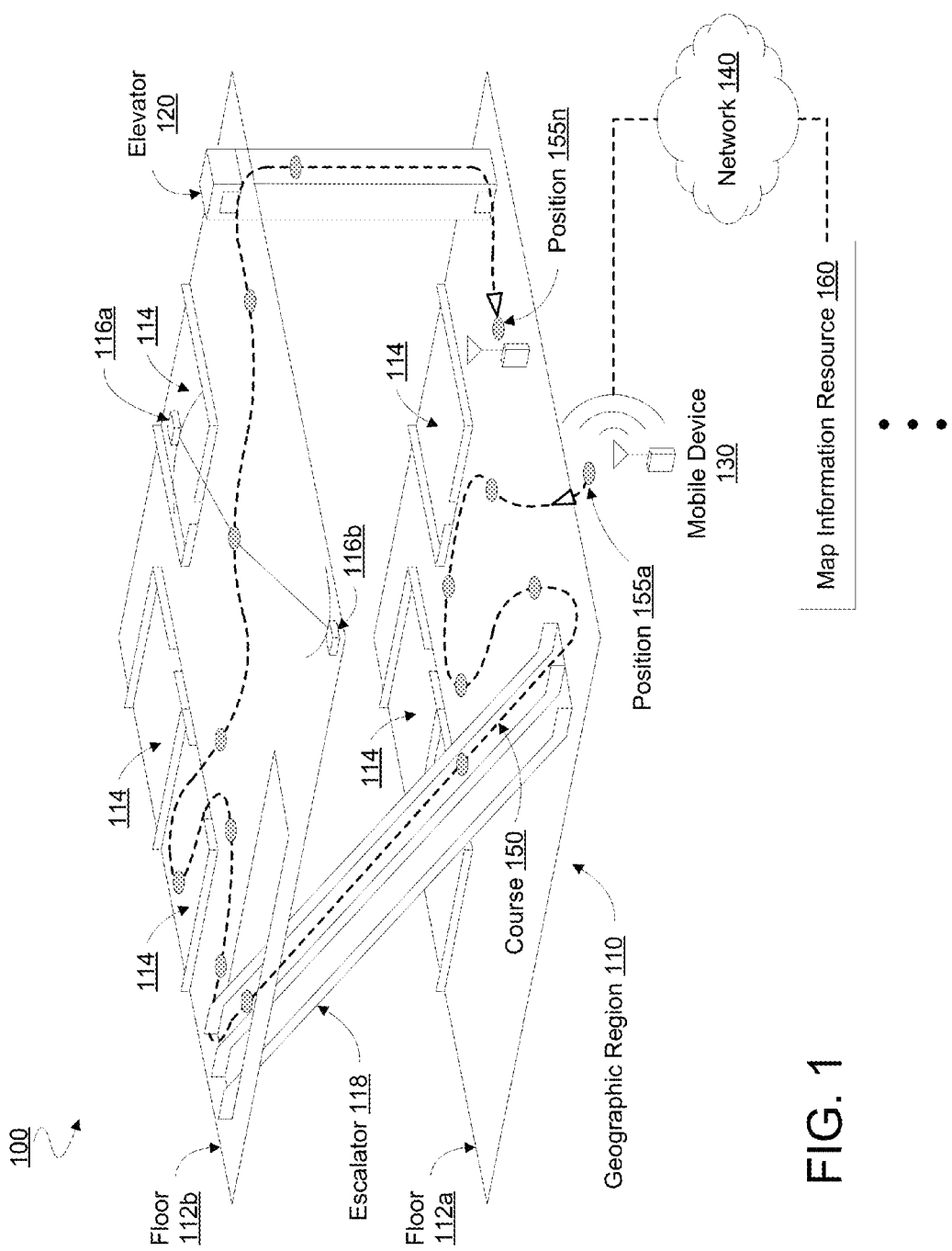
FIG. 1 is a block diagram illustrating elements of a system for mapping a course of a mobile device according to an embodiment.
Figure 2:
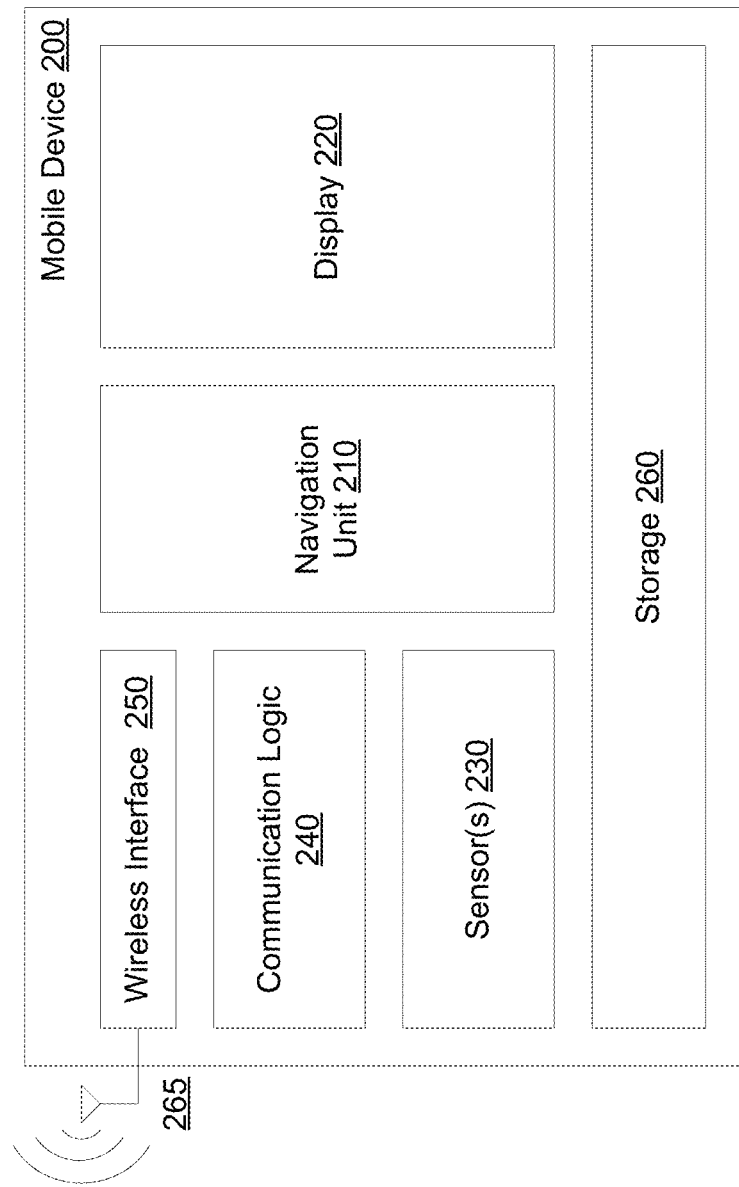
FIG. 2 is a block diagram illustrating elements of a mobile device for mapping a traversed course according to an embodiment.

FIG. 1 illustrates elements of a system 100 for mapping a course of a mobile device according to an embodiment. To illustrate elements of various embodiments, certain elements of system 100 are shown operating in a geographic region 110. However, geographic region 110 may not itself be part of system 100. The size, geometry, location and other features of geographic region 110 are merely illustrative, and are not limiting on certain embodiments.

Geographic region 110 may include one or more man-made structures—e.g. including at least a portion of one or more floors of a commercial, residential, government or other building such as a store, office, mall, warehouse and/or the like. By way of illustration and not limitation, geographic region 110 may include floors 112*a*, 112*b* having various rooms 114 (e.g. stores, offices and/or the like) and an escalator 118 and/or elevator 120 for transportation between floors 112*a*, 112*b*. Geographic region 110 may include any of a variety of combinations of one or more additional or alternative floors, rooms and/or other such features. In an embodiment, geographic region 110 includes at least a portion of multiple buildings. For example, geographic region 110 may include a neighborhood (e.g. comprising one or more city blocks), a campus, a residential development, an industrial park and/or the like. Additionally or alternatively, geographic region 110 may include any of a variety of outdoor elements.

System 100 may include a mobile device 130 which, during some period of time, traverses some course which is at least partially within geographic region 110. Mobile device 130 may include any of a variety of wireless-capable devices including, but not limited to, a smart phone, tablet, notebook, handheld game console, palmtop computer, laptop computer and/or the like. Mobile device 130 may include circuit logic to communicate wirelessly with one or more computer networks of system 100, such as an illustrative network 140. Additionally or alternatively, mobile device 130 may include wireless telephony circuitry to communicate with a cellular phone network (not shown). Additionally or alternatively, mobile device 130 may include logic to communicate with a satellite navigation system (not shown) such as the NAVSTAR Global Positioning System (GPS).

Network 140 may include any of a variety of combinations of one or more computer networks. For example, network 140 may include a local area network (LAN)—e.g. a virtual LAN (VLAN) or wireless LAN (WLAN)—a wide area network (WAN), a cloud network, an Internet and/or the like. Wireless communication between mobile device 130 and network 140 may comply with an Institute of Electrical and Electronics Engineers (IEEE) 802.11, 1999 or later specification (e.g. where the communication is compatible Wi-Fi). Additionally or alternatively, such wireless communication may comply with a Bluetooth® standard of the Bluetooth Special Interest Group (SIG), Inc. (such as the Bluetooth Specification v1.1, 2002 or later version), a WiGig specification of the Wireless Gigabit Alliance (such as the WiGig version 1.0 specification, 2009), one of the International Mobile Telecommunications-2000 (IMT-2000) specifications of the International Telecommunication Union (such as a 3G mobile communications standard), one of the 4G mobile communications standards (such as the Mobile WiMAX standard of the WiMAX Forum and/or the LTE standard of 3GPP) and/or the like. Wireless communication of mobile device 130 may comply with any of a variety of additional or alternative wireless communication specifications, according to various embodiments.

To illustrate certain features of various embodiments, FIG. 1 shows an illustrative scenario in which mobile device 130 traverses an arbitrary course 150—e.g. as a user carrying mobile device 130 travels along a sequence of positions on floors 112a, 112b. For example, traversal of course 150 may include mobile device 130 moving from a position 155a through various positions on floor 112a, ascending to floor 112b via escalator 118, entering one of the rooms 114 on floor 112b, and descending via elevator 120 to a position 155n on floor 112a. However, course 150 may include any of a variety of additional or alternative paths, positions, etc.

System 100 may provide mechanisms and/or techniques, according to different embodiments, for enabling representation of course 150 in a display of a map for geographic region 110. By way of illustration and not limitation, one or more elements of system 100 may generate course information for such representation of course 150, where such course information is based on what is referred to as context data. The term "context data," as used herein, refers to data which describes a context associated with some position of a mobile device, where such context is to be distinguished from the position per se. The context may include a characteristic—e.g. of mobile device 130, of one or more element of geographic region 110 and/or the like—which describes or otherwise indicates at least in part a traversal of course 150 by mobile device 130. The context data may, for example, be data other than any geodetic data (e.g. latitude, longitude, altitude or other such coordinate value) that specifies a position of mobile device 130. Such context data may serve as at least one basis for system 100 to estimate a position of mobile device 130.

In an embodiment, network 140 provides mobile device 130 with access to a map information resource 160 which may aid in mapping one or more positions of mobile device 130. Map information resource 160 may include one or more of a server, access point (e.g. a wireless router), desktop computer, mobile device or other such apparatus to exchange with mobile device 130 one or more communications associated with representing course 150 in a map.

For example, map information resource 160 may include a server to provide mobile device 130 with a map—e.g. such as one which might be provided by Google Maps™, MapQuest or such mapping service—which describes geographic region 110. Additionally or alternatively, map information resource 160 may provide mobile device 130 with context data and/or one or more signals with which mobile device 130 is to calculate context data. Some context data may include reference context data for later evaluation of other context data determined by mobile device 130.

Additionally or alternatively, map information resource 160 may store course information generated based on context data—e.g. where the course information is stored for some later representation of course 150 in a displayed map. Map information resource 160 may include any of a variety of additional or alternative resources to variously facilitate mapping of course 150 according to different embodiments. In an embodiment, mobile device 130 and map information resource 160 participate in a collaborative network (e.g. a cloud network, a crowdsourcing network, and/or the like).

During traversal of course 150, mobile device 130 may interact with one or more devices located within geographic region 110. Such interaction may, for example, facilitate a communicating, calculating or other determining of context data to be used in mapping course 150. By way of illustration and not limitation, geographic region 110 may include one or more beacon devices, represented by illustrative devices 116a, 116b, to variously exchange signals indicating proximity of mobile device 130 to each of devices 116a, 116b. Such signals may be at least one basis for estimating—e.g. by triangulation—a position of mobile device 130 on course 150. Techniques for evaluating device proximity and/or triangulation based on such proximity may be according to one or more conventional techniques, and may not be limiting on certain embodiments.

FIG. 200 illustrates elements of a mobile device 200 according to an embodiment for providing a map representing a traversed course. Mobile device 200 may include some or all of the features of mobile device 130, for example. In an embodiment, mobile device 200 operates as part of a networked system such as system 100. Mobile device 200 may include a wireless-capable smart phone, tablet, notebook, and/or the like. In an embodiment, mobile device 200 includes an automobile or other vehicle having integrated therein a GPS navigation component or other wireless-capable hardware.

Mobile device 200 may include a wireless interface 250 to provide for one or more types of wireless communication—e.g. via one or more antennae 265 included in, or coupled to, mobile device 200. Wireless interface 250 may include circuit logic to receive and/or transmit wireless communications with a network such as network 140. Mobile device 200 may further include communication logic 240—e.g. any of a variety of combinations of hardware, firmware and/or executing software—to direct or otherwise control communications via wireless interface 250. By way of illustration and not limitation, communication logic 240 may include a web browser or other application, running with a processor and memory (not shown), which downloads a map of a geographic region in which mobile device 200 is located, or is expected to be located.

Mobile device 200 may include navigation unit 210—e.g. including any of a variety of combinations of hardware, firmware and/or executing software—to provide navigation functionality to a user of mobile device 200. Mobile device 200 may comprise conventional satellite navigation logic, such as a GPS receiver, which is included in or otherwise accessible to navigation unit 210. In an embodiment, navigation unit 210 provides additional functionality to supplement or extend such conventional satellite navigation logic.

By way of illustration and not limitation, navigation unit 210 may determine information which describes a course traversed by mobile device 200. The determining of such course information may be performed based at least in part on navigation unit 210 detecting an indication that mobile device 200 is traversing the course in question. For example, navigation unit 210 may estimate one or more positions of mobile device 200 in response to detecting motion of mobile device 200 along the course. Additionally or alternatively, navigation unit 210 may estimate such one or more positions of mobile device 200 in response to detecting an unavailability of a satellite navigation resource—e.g. where a GPS signal is lost or falls below some threshold strength level.

In an embodiment, such course information may be used to generate a representation of the course in a map. Such a map may be presented on a display 220 of mobile device 200, although certain embodiments are not limited in this regard. In an embodiment, the traversed course is not a predetermined course. For example, mobile device 200 may not have access to any data which explicitly specifies the course prior to traversal of the course by mobile device 200.

To aid in plotting the traversal of the course, navigation unit 210 may determine a sequence of estimates each for a respective position of mobile device 200 on the course. Determining such a sequence of position estimates for mobile device 200 may, for example, include navigation unit 210 determining one or more such position estimates each based on context data other than any geodetic data that specifies a position of mobile device 200. For example, navigation unit 210 may calculate a first estimate of a first position of mobile device 200 independent of any geodetic data that specifies that first position.

In an embodiment, navigation unit 210 generates course information which describes such a determined sequence of position estimates. Such course information may, for example, be provided to storage 260 of mobile device 200. Storage 260 may, for example, include any of a variety of combinations of one or more computer readable storage media such as solid state drive, disk drive, flash memory and/or the like. Additionally or alternatively, such course information may be sent wirelessly from mobile device 200 to a remote network storage resource.

Mobile device 200 may include one or more mechanisms for determining context data which is to be a basis for navigation unit 210 determining one or more such position estimates. For example, mobile device 200 may include one or more sensors 230 coupled to navigation unit 210, the one or more sensors 230 to provide context data and/or one or more signals used to calculate context data. In an embodiment, one or more sensors 230 include inertial sensor hardware such as one or more of a gyroscope, accelerometer, pedometer and/or the like. Such inertial sensor hardware may communicate to navigation unit 210 a signal indicating movement of mobile device 200 during traversal of the course to be mapped. Navigation unit 210 may process such a signal to determine context data describing context—e.g. one or more of a speed of mobile device 200, a rotation of mobile device 200, a direction of movement of mobile device 200, an acceleration of mobile device 200 and/or the like.

Additionally or alternatively, one or more sensors 230 may include environmental sensor hardware to evaluate one or more environmental conditions of a geographic region. By way of illustration and not limitation, one or more sensors 230 may include an ambient light sensor, image sensor or other such hardware to detect a lighting condition of an environment which is, at some point in time, near mobile device 200. Additionally or alternatively, one or more sensors 230 may include a microphone or other such hardware to detect one or more sounds in such an environment. Additionally or alternatively, one or more sensors 230 may include a barometric sensor or other such hardware to detect an atmospheric pressure of such an environment. Additionally or alternatively, one or more sensors 230 may include a compass sensor to detect a reference direction such as true North or magnetic North. Such a compass sensor may be integrated into a gyroscope sensor, in one embodiment. One or more sensors 230 may include any of a variety of additional or alternative environmental sensors, according to different embodiments.

In certain embodiments, mobile device 200 may receive context data (and/or a signal used to determine context data) from one or more networked resources via wireless interface 250. By way of illustration and not limitation, mobile device 200 may detect a beacon or other signal sent from another device in the geographic region, the beacon or other signal indicating a proximity of mobile device 200 and the other device to one another. Additionally or alternatively, mobile device 200 may receive from the other device data—e.g. geodetic data—specifying a location of the other device. Mobile device 200 may additionally or alternatively receive reference context data which describes an environmental characteristic of the geographic region. By way of illustration and not limitation, such an environmental characteristic may include one or more of a lighting characteristic, a sound characteristic a barometric pressure characteristic. Such reference context data may further identify an association of the characteristic with a particular position or positions (e.g. a sub-region) of the geographic region.

In an embodiment, context data is made available wirelessly to mobile device 200 via crowdsourcing, cloud computing and/or any of a variety of other collaborative network techniques. For example, mobile device 200 may operate as one of multiple devices coupled to each other in a collaborative network—e.g. the multiple devices including one or more other mobile devices, servers and/or the like. At different times and/or concurrently, one or more such collaborative devices may be variously located in the geographic region—e.g. in different floors, rooms, elevators, escalators, etc. The collaborative devices may be configured to cooperate with each other to enable navigation unit 210 to be potentially more effective in estimating a position of mobile device 200. By way of illustration and not limitation, one or more of the collaborative devices may be configured to collect and provide context data—e.g. including reference context data such as environment lighting data, environment sound data, environment barometric pressure data and/or the like. In an embodiment, a server providing a cloud computing, crowdsourcing or other collaboration service may communicate the provided context data for navigation unit 210 to estimate a position of mobile device 200. Thus, mobile device 200 may be considered a client device of a collaborative network service, where one or more tasks of context data collection are outsourced to other client devices and/or server devices of the collaborative network.

In an embodiment, mobile device 200 may compare context data determined locally by mobile device 200 with reference context data provided from a collaborative network. Based on such comparison, mobile device 200 may detect that a position of the traversed course is within a sub-region corresponding to the reference context data. An estimate of such a position may be calculated based at least in part on such detection—e.g. where the identified sub-region supplements inertial context data for calculation of the estimate.

Figure 3:
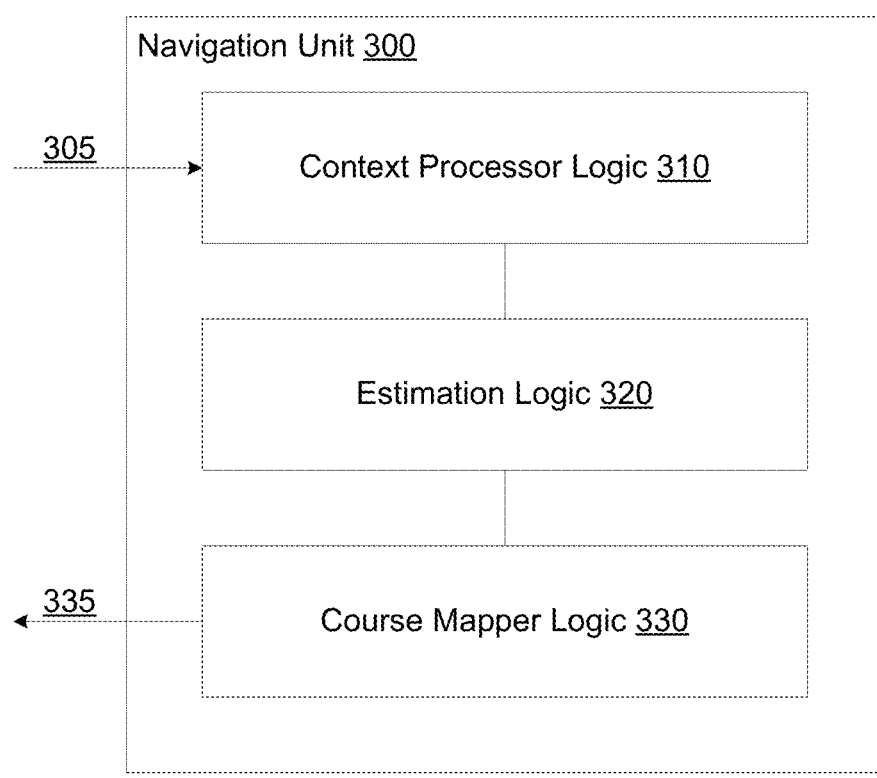
FIG. 3 is a block diagram illustrating elements of a navigation unit for providing course information according to an embodiment.

FIG. 3 illustrates elements of a navigation unit 300 to provide information for representing a course in a map according to an embodiment. In an embodiment, navigation unit 300 is to operate in a device such as mobile device 200. For example, navigation unit 300 may include some or all of the features of navigation unit 210.

In an embodiment, navigation unit 300 comprises context processor logic 310 to determine context data indicating a traversal of a course by a mobile device which includes navigation unit 300. For example, context processor logic 310 may receive input 305 including one or more values of context data and/or one or more signals to be used by context processor logic 310 in calculating context data. Some or all of input 305 may be provided from one or more sensors of the mobile device—e.g. such as sensors 230.

For example, input 305 may include information from one or more inertial sensors of the mobile device. Such inertial information may describe speed, direction, acceleration, rotation and/or other characteristic of motion by the mobile device. Alternatively or in addition, some or all of input 305 may be provided from one or more environment sensors of the mobile device. For example, input 305 may additionally or alternatively include information describing one or more characteristics—e.g. an ambient light condition, one or more sounds, a barometric pressure and/or the like—of an environment which is local to the mobile device at some point in time.

In an embodiment, input 305 includes reference context information which, for example, is provided from one or more devices in a collaborative network with the mobile device. By way of illustration and not limitation, input 305 may additionally or alternatively identify a reference environmental condition including, for example, a reference lighting condition, a reference sound, a reference barometric pressure and/or the like. Input 305 may further identify a position or positions—e.g. a specific sub-region—within the geographic region as corresponding to a particular reference environmental condition.

Context processor logic 310 may determine from input 305 context data other than any geodetic data that specifies a position of the mobile device. Such context data may, for example, be determined in response to one or more sources of such geodetic data—e.g. a resource of GPS or other such satellite navigation system—being unavailable to the navigation unit 300.

Navigation unit 300 may further include estimation logic 320 to estimate the course traversed by the mobile device. For example, estimation logic 320 may determine a sequence of multiple estimates each for a respective position of the device on the course. Determining such a sequence may, for example, be based on a detection of the traversal—e.g. in response to context processor logic 310 detecting movement of the mobile device above some minimum threshold level.

Determination of the sequence of estimated positions may include estimation logic 320 determining, with one or more values of the context data, a first estimate of a first position of the mobile device. For example, the first estimate may be calculated independent of any geodetic data that specifies the first position. Estimating a position in the sequence of positions may include estimation logic 320 estimating a length and direction of movement from a preceding position in the sequence. Based on the estimated length and direction, estimation logic 320 may calculate geodetic data—e.g. a latitude value and a longitude value—specifying a position corresponding to the estimated movement from the preceding position in the sequence.

Navigation unit 300 may further include course mapper logic 330 to generate course information 335 for a representation of the determined sequence of positions in a map. By way of illustration and not limitation, course information 335 may link multiple position estimates in succession as a sequence. Additionally or alternatively, course information 335 may include metadata specific to one or more respective position estimates. Such metadata may, for example, include timestamp information identifying a date and/or time when the mobile device was at (or near) the corresponding estimated position of the course. Such timestamp information may be included in a representation of the traversed course which is shown in a displayed map.

Figure 4:
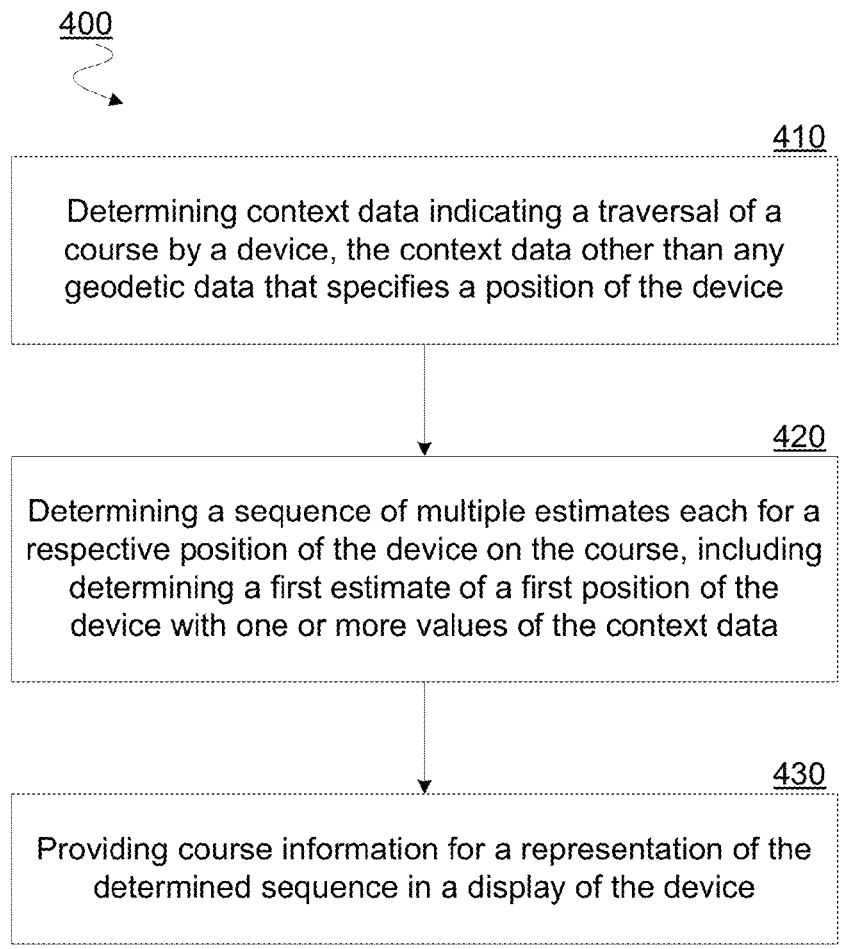
FIG. 4 is a flow diagram illustrating elements of a method according to an embodiment for representing a course traversed by a mobile device.

FIG. 4 illustrates elements of a method 400 according to an embodiment for representing a course traversed by a mobile device. Method 400 may be performed to represent a course—e.g. course 150—traversed by a device such as mobile device 200. In an embodiment, method 400 is performed by navigation unit 300.

Method 400 may include, at 410, determining context data indicating a traversal of a course by the device. In an embodiment, the context data determined at 410 is data other than any geodetic data that specifies a position of the device. For example, such context data may include inertial data specifying a characteristic of motion by the mobile device. Alternatively or in addition, the context data may describe an environmental condition of a geographic region which, at some point in time, includes or is near to the mobile device. In an embodiment, context data determined at 410 includes reference context data such as that provided to the mobile device via a collaborative network.

Method 400 may further include, at 420 determining a sequence of multiple estimates each for a respective position of the device on the course. In an embodiment, the sequence is determined at 420 based on a detection of the traversal of the course by the device. The determining at 420 may include determining, with one or more values of the context data, a first estimate of a first position of the device, where the first estimate is determined independent of any geodetic data that specifies the first position. Determination of the sequence at 420 may be performed, for example, in response to the mobile device detecting that a source of geodetic data—e.g. a satellite navigation resource—is not available.

Method 400 may further include, at 430 providing course information for a representation of the determined sequence in a display of the device. The course information may, for example, include information identifying for a given position estimate of the sequence another position estimate which is adjacent in the sequence. Additionally or alternatively, the course information may include timestamp information to be included in the displayed representation of the course. Such timestamp information may, for example, specify a time (e.g. a period of time) when the mobile device was at or near a position corresponding to such timestamp information. In an embodiment, the course information provided at 430 is to augment map information downloaded or otherwise accessed by the mobile device. For example, such map information may be augmented for a resulting display of the map to further include a graphical representation of the traversed course.

Figure 5:
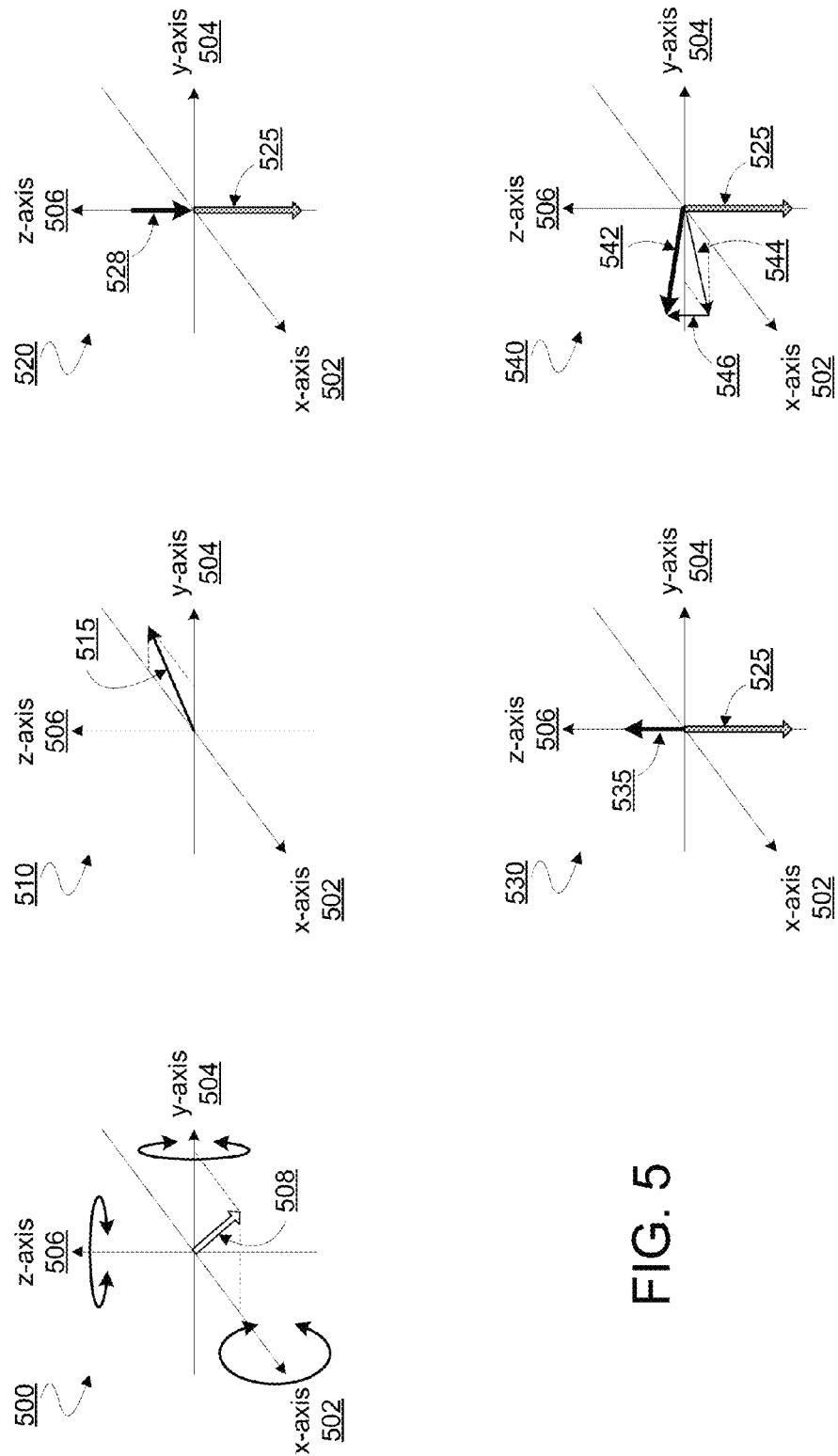
FIG. 5 is a set of vector diagrams illustrating respective motions of a mobile device which includes navigation logic according to an embodiment.

FIG. 5 represents various motions 500, 510, 520, 530, 540 of a mobile device which may take place during traversal of a course mapped according to an embodiment. Motions 500, 510, 520, 530, 540 are each shown in FIG. 5 with respect to an x-axis 502, a y-axis 504 and a z-axis 506 of the mobile device. A given axis—e.g. z-axis 506—may correspond to a vertical (e.g. upward and/or downward) line of movement of the mobile device.

Some or all of motions 500, 510, 520, 530, 540 may be variously detected, for example, by one or more inertial sensors of the mobile device. In an embodiment, circuit logic such as that of navigation unit 300 may determine context data including one or more values describing such motion. In an embodiment, such context data may be used to estimate one or more positions of a course traversed by the mobile device.

Motion 500 includes rotation of the mobile device around one or more of x-axis 502, y-axis 504 and z-axis 506. The mobile device may, for example, include one or more gyroscope sensors to detect motion 500. In an embodiment, the one or more gyroscope sensors may be configured to keep track of some reference direction 508 during rotational motion 500 of the mobile device. By way of illustration and not limitation, reference direction 508 may correspond to true North. Additionally or alternatively, reference direction 508 may be tracked at least in part by a compass of the mobile device—e.g. where reference direction 508 corresponds to magnetic North.

Motion 510 may include acceleration 515 of the mobile device in a horizontal direction—e.g. some direction in the plane formed by x-axis 502 and y-axis 504. In an embodiment, motion 510 is detected by an accelerometer, pedometer, or other such linear motion sensor of the mobile device. Circuit logic such as that of navigation unit 300 may estimate a change in position of the mobile device due to acceleration 515. By way of illustration and not limitation, navigation unit 300 (or other such logic) may calculate an integral of acceleration 515 over time to estimate a velocity vector, a direction and distance of travel, and/or other information associated with the change in position of the mobile device. In an embodiment, an estimated direction and distance of travel may be used—e.g. in a plane sailing calculation, a Mercator sailing calculation and/or the like—to determine based on an earlier-in-time position (e.g. or estimate thereof) a position of the mobile device which results from motion 510.

Motion 520 may include a downward acceleration 528 of the mobile device. In an embodiment, motion 520 is detected by an accelerometer of the mobile device. Navigation unit 300 (or other such logic) may be configured to distinguish downward acceleration 528 from a baseline acceleration 525 due to gravity. Circuit logic such as that of navigation unit 300 may estimate a change in position of the mobile device due to acceleration 528—e.g. in a manner similar to that described with respect to acceleration 515. In an embodiment, course mapper logic 330 or other logic of navigation unit 300 may identify that acceleration 528 is associated with a particular type of feature of a geographic region. By way of illustration and not limitation, course mapper logic 330 may determine that the substantially downward direction of acceleration 528 is indicative of the mobile device moving downward in an elevator. For example, evaluation of motion 520 may be used to determine that a mobile device is moving in elevator 120 from floor 112b toward floor 112a.

Motion 530 may include an upward acceleration 535 of the mobile device. As with motion 520, motion 530 may be detected by an accelerometer of the mobile device—e.g. where navigation unit 300 is configured to distinguish acceleration 535 from baseline gravity acceleration 525. In an embodiment, circuit logic such as that of navigation unit 300 may estimate a change in position of the mobile device due to acceleration 535—e.g. in a manner similar to that described with respect to acceleration 515. Course mapper logic 330 or other logic of navigation unit 300 may identify that acceleration 535 is associated with a particular type of feature of a geographic region. By way of illustration and not limitation, course mapper logic 330 may determine that the substantially upward direction of acceleration 535 is indicative of the mobile device moving upward in an elevator. For example, evaluation of motion 530 may be used to determine that a mobile device is moving in elevator 120 from floor 112a toward floor 112b.

Motion 540 may include an acceleration 542 of the mobile device which comprises a component 546 along z-axis 506 and a component 544 in the plane formed by x-axis 502 and y-axis 504. Circuit logic such as that of navigation unit 300 may estimate a change in position of the mobile device due to acceleration 542—e.g. in a manner similar to that described with respect to acceleration 515. In an embodiment, course mapper logic 330 or other logic of navigation unit 300 may identify that acceleration 542 is associated with a particular type of feature of a geographic region. By way of illustration and not limitation, course mapper logic 330 may determine that the combination of horizontal and vertical components of acceleration 542 is indicative of the mobile device moving in an escalator—e.g. in an upward direction. For example, evaluation of motion 540 may be used to determine that a mobile device is moving in escalator 118 from floor 112a toward floor 112b.

Figure 6:
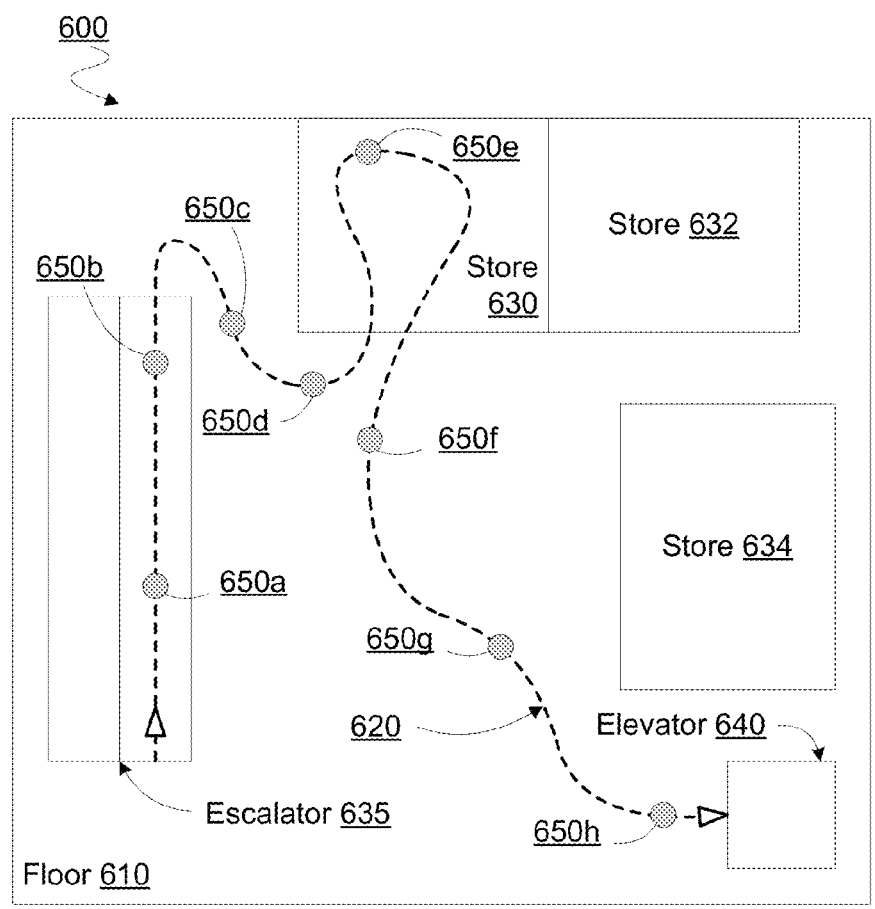
FIG. 6 is a block diagram illustrating elements of a map generated according to an embodiment.

FIG. 6 illustrates elements of a map 600 including a representation 620 of at least part of a course traversed by a mobile device. Representation 620 corresponds to a portion of the course which is on a floor 610 of a building, where floor 610 includes an escalator 635, stores 630, 632, 634 and an elevator 640. However, the size, geometry, location and other features of floor 610 are merely illustrative, and are not limiting on certain embodiments. The course illustrated at least in part by representation 620 may further extend to one or more regions (not shown) outside of floor 610.

In the illustrative scenario of map 600, representation 620 includes representations 650a, . . . , 650h each for a respective geographic position of the mobile device on the course. Some or all of representations 650a, . . . , 650h may be generated each based on respective estimate of a corresponding geographic position of the mobile device. One or more such estimates may be determined based on context data other than geodetic data that specifies some position of the mobile device. By way of illustration and not limitation, an estimate of a first position of the mobile device may be determined independent of any geodetic data which specifies that first position.

Representation 620 may include one or more features to graphically show a sequence of the estimated positions of the course. By way of illustration and not limitation, representation 620 may include curved and/or linear lines interconnecting representations 650a, . . . , 650h. Additionally or alternatively, representation 620 may include one or more arrows, colors and/or other such visual elements to indicate a direction of the sequence—e.g. a direction of the course as traversed by the mobile device.

Map 600 may provide additional information describing traversal of the course by the mobile device. For example, map 600 may display for one or more of representations 650a, . . . , 650h respective timestamp information (not shown) which identifies for a given estimate of a position a date and/or time when the mobile device at (or near) that position.

Figure 7:
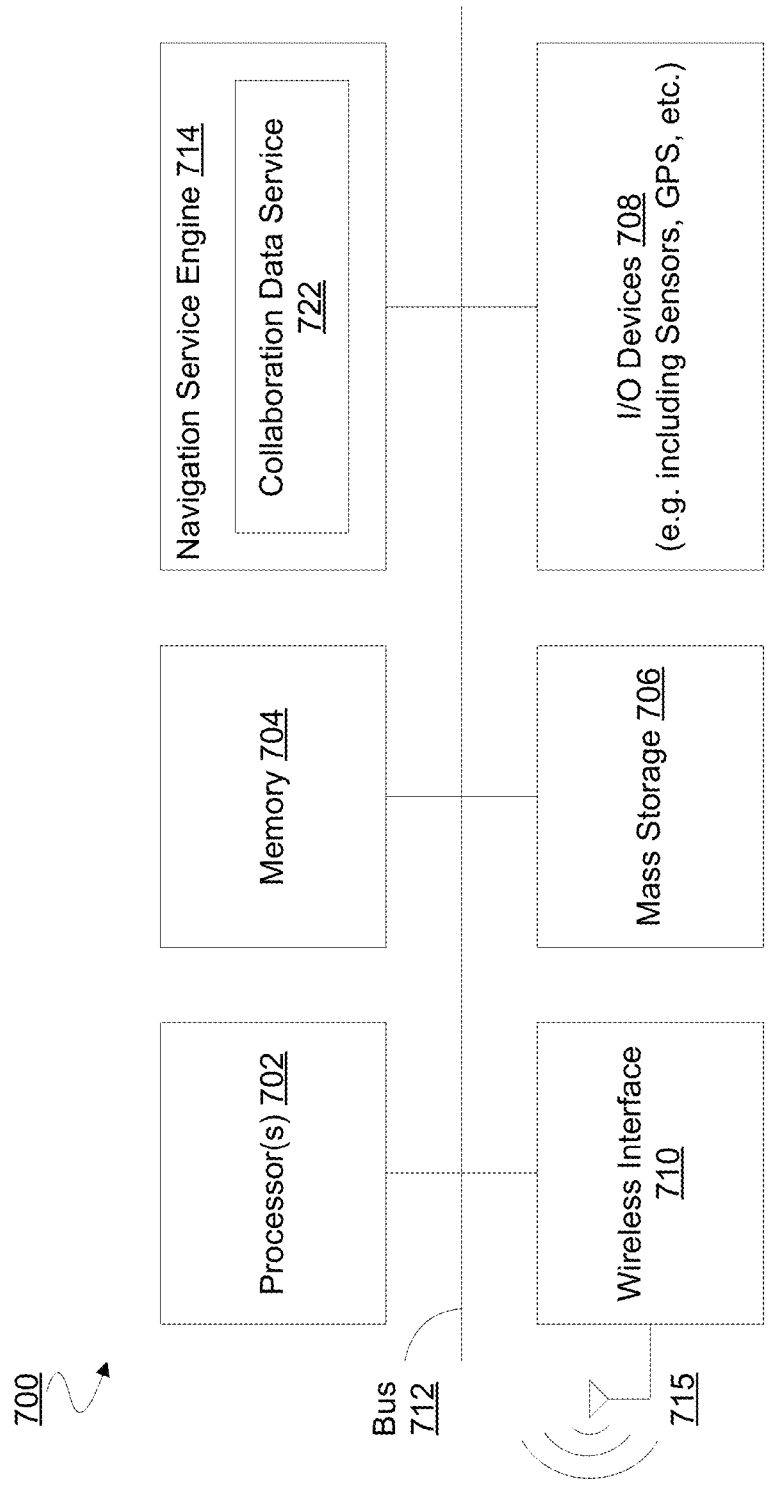
FIG. 7 is a block diagram illustrating elements of a computer system for determining course information according to an embodiment.

FIG. 7 illustrates elements of a computer system 700 suitable for use as a mobile device in accordance with various embodiments. In various embodiments, computer system 700 may have more or less components, and/or different architectures.

As shown, computer system 700 includes a processor and memory arrangement having a number of processors or processor cores 702 and system memory 704. For the purpose of this disclosure, the terms "processor" and "processor cores" may be considered synonymous, unless the context clearly requires otherwise. Additionally, computer system 700 may include a mass storage device 706 (such as diskette, hard drive, solid state disk, compact disc read only memory (CD-ROM) and so forth), one or more input/output (I/O) devices 708 (such as one or more of the environmental sensors, inertial sensors and/or satellite navigation components discussed herein), wireless interface 710 (such as, WiFi, Bluetooth, 4G network interface cards, modems and so forth) and one or more antennae 715. In an embodiment, one or more I/O devices 708 includes a display to present a map including a representation of a course traversed by computer system 700. The elements of computer system 700 may be coupled to each other via system bus 712, which represents one or more buses. In the case of multiple buses, the multiple buses may be bridged by one or more bus bridges (not shown).

Some or all elements of computer system 700 may be configured to perform various respective conventional functions known in the art. For example, processors 702 may be configured to provide an application execution environment with memory 704. In addition to such conventional functions, a navigation service engine 714 of computer system 700 may provide some or all of the functionality of navigation unit 300, for example. Although shown as separate from processors 702, navigation service engine 714 may, in an alternate embodiment, be implemented as a process running in an execution environment of processors 702.

In an embodiment, navigation service engine 714 comprises a processor configured to provide an execution environment that is separate from the application execution environment of processors 702. Processes in such an execution environment of navigation service engine 714 may run independent of an application execution environment of processors 702. In an embodiment, functionality of navigation service engine 714—e.g. to determine course information for mapping a traversed course—may be provided while processors 702 and/or other components of computer system 700 operate in a given power state. Such a power state may, for example, be lower than a power state which would otherwise be needed for such functionality to be provided by the execution environment of processors 702.

Navigation service engine 714 may provide a collaboration data service 722 in support of operations for mapping a course traversed by computer system 700. Collaboration data service 722 may access context data and/or other information received from a cloud network, crowdsourcing server or other collaborative network resource via wireless interface 710. In an alternate embodiment, collaboration data service 722 is separate from, and in communication with, navigation service engine 714—e.g. where collaboration data service 722 is a process running in an application execution environment of processors 702.

Mass storage 706 may include a persistent copy of the programming instructions for collaboration data service 722 and/or any other application which is to run in an execution environment of computer system 700. The persistent copy of such programming instructions may be placed into mass storage 706 in the factory, or in the field, through, e.g., a distribution medium (not shown), such as a compact disc (CD), or through wireless interface 710.

Figure 8:
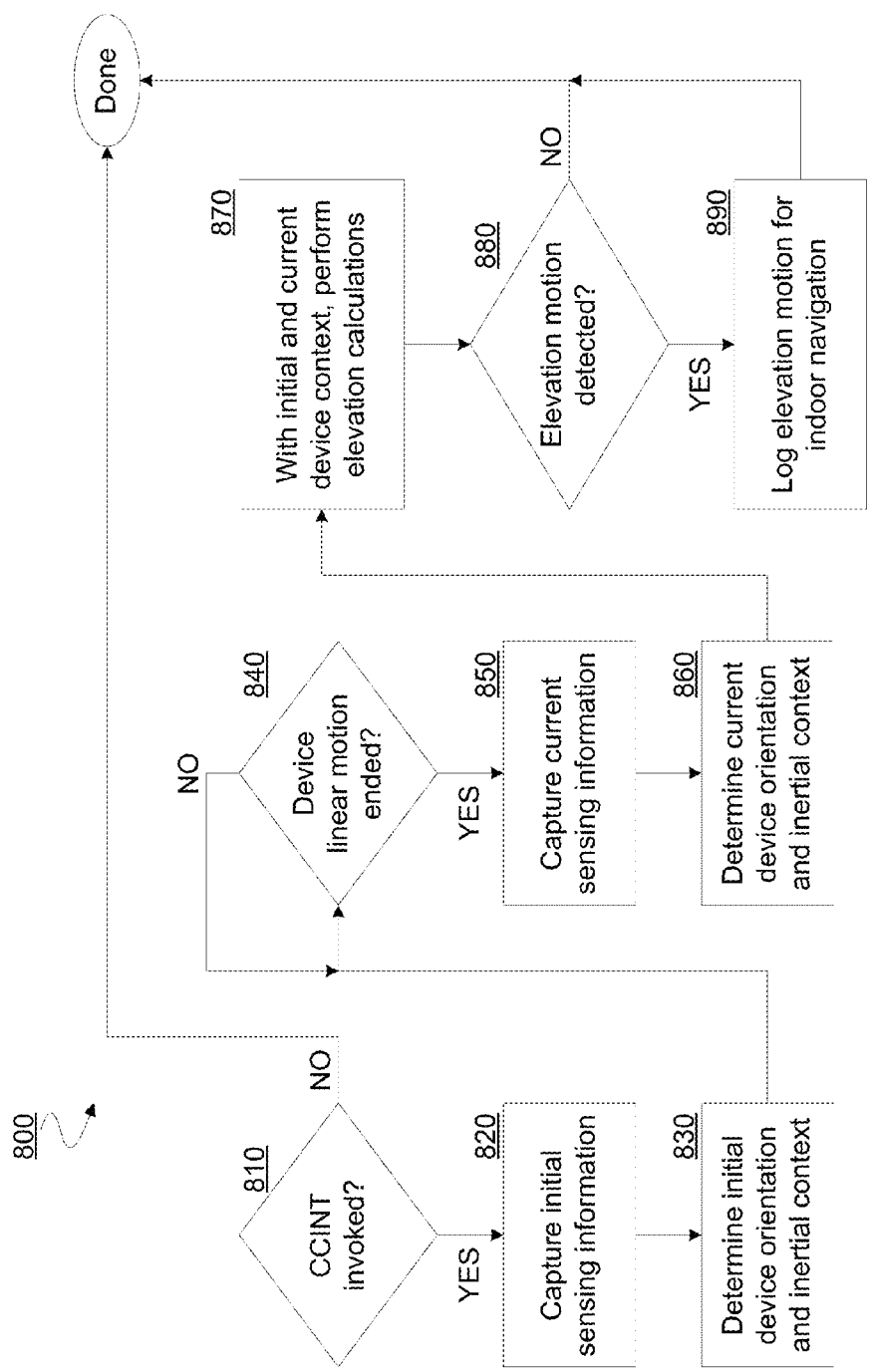
FIG. 8 is a flow diagram illustrating elements of a method according to an embodiment for tracking movement by a mobile device.

FIG. 8 shows a method 800 for implementing functionality such as that of navigation unit 300 according to an embodiment. In an embodiment, such functionality includes cloud assisted context-aware indoor navigation tracing (CCINT). In CCINT according to method 800, a gravity vector may be used in detecting a mobile devices orientation, such as face up, face down, landscape, portrait, etc. When the device is at rest, the output of the gravity sensor should be identical to that of the device's accelerometer. CCINT may use a linear acceleration vector $(X_{lin}, Y_{lin}, Z_{lin})$, a gravity vector $(X_g, Y_g, Z_g)$, and compass information (e.g. heading, pitch and roll) primarily, and use barometer, audio and light contextual information as secondary metrics to detect for a user's motion in elevation—e.g. via an elevator or escalator.

Regardless of the location of the mobile device, linear acceleration, gravity and compass vectors for the mobile device may be variously orthogonal or parallel to each other. For example, when a user moves a mobile device downwards, the gravity and linear acceleration vectors are parallel, and when the user moves the mobile device upwards, the gravity and linear acceleration vectors are opposite to one another and orthogonal to the compass vector. CCINT may use such information to characterize a device's motion—e.g. deriving these vectors from sensors at a high sampling rate (e.g. every 30 ms) for a specified period of time. Such a sampling rate may be automatically or manually configurable, according to different embodiments. Secondary metrics like data from an audio context engine, proximity sensors, ambient light sensors, a barometer, etc. may also be used by CCINT logic to improve a confidence level of the primary data regarding device motion.

The CCINT of method 800 may maintain a history of device context and use a most recent context as a reference "initial" context—e.g. in response to detecting a linear acceleration. In an embodiment, a user may configure the mobile device to set a number N past device contexts to save and/or to save context for one or more points-of-interest. At some later time, the method 800 may calculate later "current" device context information—e.g. including one or more of device orientation, elevation, barometric pressure, etc. In an embodiment, such current context information may be calculated using a sensor hub in response to linear acceleration of the device ending.

For example, on invocation of CCINT at 810, method 800 may capture initial sensing information, at 820. Such initial information may include, but is not limited to, information specifying location, gravity, compass, accelerometer, gyroscope, barometer, ambient light, sound, etc. CCINT may build initial device context (device location, orientation, elevation using barometer, etc) using a sensor hub of the device. Such a sensor hub may be coupled to one or more sensors—e.g. where the sensor hub provides a minimal execution environment independent of a host CPU of the device platform.

Based on the initial sensing information captured at 820, method 800 may determine, at 830, initial device orientation and inertial context. In an embodiment, the determining at 830 includes determining a device elevation using a barometric sensor on the mobile platform, along with crowd sourcing information regarding environmental barometric conditions. The determining at 830 may include determining one or more of device orientation (landscape/portrait, face up/down) using motion sensors, light and/or sound context (in daylight, inside building, inside a user's bag, pocket, etc.) using ambient light/sound sensor(s), device elevation within a building using barometer and/or crowd sourcing techniques, and the like.

Subsequently, method 800 may determine, at 840, whether linear motion of the mobile device has ended. When such linear motion has ended, method 800 may capture current sensing information, at 850, and determine current device orientation and inertial context, at 860. The operations 850, 860 may have some or all of the features of operations 820, 830, respectively.

Using the initial and final device context information, CCINT may perform elevation calculations 870 to evaluate a change in elevation of the mobile device. The method 800 may detect at 880 whether there is any elevation motion of the mobile device. If such motion is detected at 880, the method 800 may log information describing the elevation motion, at 890, where such logged information is available for indoor navigation.

Figure 9:
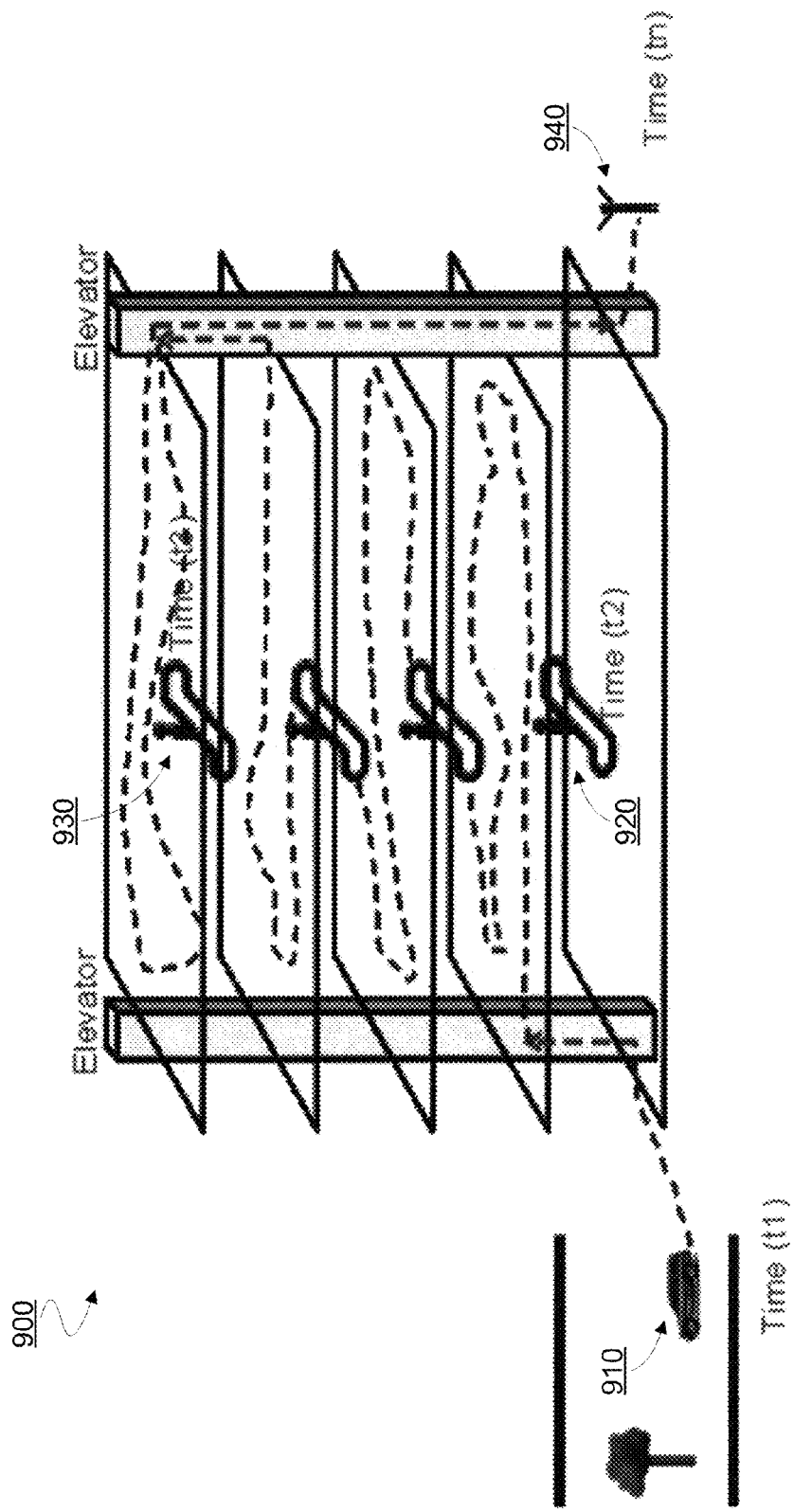
FIG. 9 is a block diagram illustrating a course of a mobile device for which mapping is provided according to an embodiment.

FIG. 9 illustrates elements of a course 900 traversed by a mobile device for which mapping is provided according to an embodiment. In an illustrative scenario according to one embodiment, a user carries mobile device along course 900, where the mobile device includes logic to provide some or all of the functionality of navigation unit 300. For example, course 900 may include a location 910 at a time t1, a location 920 at a time t2, a location 930 at a time t3 and a location 940 at a time t4. However, course 900 may include any of a variety of additional or alternative locations.

The mobile device traversing course 900 may allow a user to find a point-of-interest within a high rise building, shopping mall, hospitals, etc. with or without GPS. Quite often, people visiting large and complex public venues like shopping malls, convention centers, hospitals, etc. have a tough time remembering a previously traversed portion of a course—e.g. where the user entered a building and/or a path taken within the building during a particular period of time.

Current mobile devices do not have the capability to offer users access to a "trail-of-breadcrumbs"—e.g. including X, Y, Z coordinates and corresponding timestamp information—for a user to trace back some path traversed in a building. Such information may be useful, for example, when a user gets disoriented and/or when a user misplaces a personal item somewhere within a building and wants to trace back to a place they had previously stopped to find their missing belongings.

Traversal of course 900 may include vertical (elevation) motion of the mobile device—e.g. at time t2 and/or time t3—in an elevator or escalator within a high rise building. Precise detection of such elevation motion may be used to estimate a 3D location (including elevation) within such a high rise building for indoor navigation—e.g. where GPS does not work due to loss of satellite signal. In an embodiment, three-dimensional indoor location information based on such precise detection may trigger prediction of a next floor of the building to be represented in a map.

With cloud computing support, "trial-of-breadcrumbs" information may be uploaded for later access, whereby a user may be able to subsequently trace back a path for an earlier period of time. In an embodiment, trail information may be overlaid on a map (e.g. including an indoor 3D layout) to provide a user a heads-up display as they retrace their steps, to show points where they stopped, to show a path ahead, to show a path already traversed and/or to provide options like fast forward, pause, rewind, etc.

In one implementation, an apparatus comprises context processor logic to determine context data indicating a traversal of a course by a mobile device, the context data other than any geodetic data that specifies a position of the mobile device. The apparatus further comprises estimation logic to determine, based on a detection of the traversal, a sequence of multiple estimates each for a respective position of the mobile device on the course, wherein the estimation logic to determine the sequence includes the estimation logic to determine, with one or more values of the context data, a first estimate of a first position of the mobile device independent of any geodetic data that specifies the first position. The apparatus further comprises course mapper logic to provide course information for a representation of the determined sequence in a display of the mobile device.

In an embodiment, the estimation logic to determine the sequence of multiple estimates is in response to an unavailability of a satellite navigation resource. In an embodiment, the context data is based at least in part on a signal from an inertial sensor of the device. In an embodiment, the context data describes an environmental characteristic of a region including a position of the course. In an embodiment, the environmental characteristic includes one of a lighting condition, a sound and an atmospheric pressure. In an embodiment, the context data includes reference context data for comparison to other context data, the reference context data provided to the mobile device by a collaborative network. In an embodiment, the estimation logic to determine the first estimate of the first position includes the estimation logic to estimate elevation motion of the mobile device. In an embodiment, the course mapper logic to provide the course information includes the course mapper logic to provide timestamp information for one of the multiple estimates, the timestamp information for inclusion in the representation of the determined sequence.

In another implementation, a system comprises a navigation unit including context processor logic to determine context data indicating a traversal of a course by a mobile device, the context data other than any geodetic data that specifies a position of the mobile device. The navigation unit further comprises estimation logic to determine, based on a detection of the traversal, a sequence of multiple estimates each for a respective position of the mobile device on the course, wherein the estimation logic to determine the sequence includes the estimation logic to determine, with one or more values of the context data, a first estimate of a first position of the mobile device independent of any geodetic data that specifies the first position. The navigation unit further comprises course mapper logic to provide course information. The system further comprises a display to provide a map including a representation of the determined sequence.

In an embodiment, the estimation logic to determine the sequence of multiple estimates is in response to an unavailability of a satellite navigation resource. In an embodiment, the context data is based at least in part on a signal from an inertial sensor of the device. In an embodiment, the context data describes an environmental characteristic of a region including a position of the course. In an embodiment, the environmental characteristic includes one of a lighting condition, a sound and an atmospheric pressure. In an embodiment, the context data includes reference context data for comparison to other context data, the reference context data provided to the mobile device by a collaborative network. In an embodiment, the estimation logic to determine the first estimate of the first position includes the estimation logic to estimate elevation motion of the mobile device. In an embodiment, the course mapper logic to provide the course information includes the course mapper logic to provide timestamp information for one of the multiple estimates, the timestamp information for inclusion in the representation of the determined sequence.

In another implementation, a method comprises determining context data indicating a traversal of a course by a device, the context data other than any geodetic data that specifies a position of the device. The method further comprises determining, based on a detection of the traversal, a sequence of multiple estimates each for a respective position of the device on the course. Determining the sequence includes, with one or more values of the context data, determining a first estimate of a first position of the device independent of any geodetic data that specifies the first position. The method further comprises providing course information for a representation of the determined sequence in a display of the device.

In an embodiment, the determining the sequence of multiple estimates is in response to detecting an unavailability of a satellite navigation resource. In an embodiment, the context data is based at least in part on a signal from an inertial sensor of the device. In an embodiment, the context data describes an environmental characteristic of a region including a position of the course. In an embodiment, the environmental characteristic includes one of a lighting condition, a sound and an atmospheric pressure. In an embodiment, the context data includes reference context data for comparison to other context data, the reference context data provided to the mobile device by a collaborative network. In an embodiment, determining the first estimate of the first position includes estimating elevation motion of the device. In an embodiment, providing the course information includes providing timestamp information for one of the multiple estimates, the timestamp information for inclusion in the representation of the determined sequence.

In another implementation, a computer-readable storage medium has stored thereon instructions which, when executed by one or more processing units, cause the one or more processing units to perform a method comprising determining context data indicating a traversal of a course by a device, the context data other than any geodetic data that specifies a position of the device. The method further comprises determining, based on a detection of the traversal, a sequence of multiple estimates each for a respective position of the device on the course. The determining the sequence includes determining, with one or more values of the context data, a first estimate of a first position of the device independent of any geodetic data that specifies the first position. The method further comprises providing course information for a representation of the determined sequence in a display of the device.

In an embodiment, the determining the sequence of multiple estimates is in response to detecting an unavailability of a satellite navigation resource. In an embodiment, the context data is based at least in part on a signal from an inertial sensor of the device. In an embodiment, the context data describes an environmental characteristic of a region including a position of the course. In an embodiment, the context data includes reference context data for comparison to other context data, the reference context data provided to the mobile device by a collaborative network. In an embodiment, determining the first estimate of the first position includes estimating elevation motion of the device.

Techniques and architectures for providing mapping information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
    context processor logic comprising circuitry configured to determine context data indicating a traversal of a course by a mobile device, the context data other than any data that specifies a position in a geodetic coordinate system, wherein the context data includes:
        reference context data provided to the apparatus via a collaborative network, wherein the reference context data describes a characteristic of an environment distinct from the mobile device, the environment including a position of the course; and
        other context data based on a detection of the characteristic of the environment during the traversal with a sensor of the mobile device;
    estimation logic comprising circuitry configured to determine, in response to the traversal, a sequence of multiple estimates each for a respective position of the mobile device on the course, wherein the estimation logic to determine the sequence includes the estimation logic to perform a comparison of the reference context data to the other context data and, based on the comparison, to determine a first estimate of a first position of the mobile device; and course mapper logic to provide course information to represent the determined sequence in a display of the mobile device.

2. The apparatus of claim 1, wherein the estimation logic to determine the sequence of multiple estimates is in response to an unavailability of a satellite navigation resource.

3. The apparatus of claim 1, wherein the context data is based at least in part on a signal from an inertial sensor of the mobile device.

4. The apparatus of claim 1, wherein the reference context data is provided to the apparatus via the collaborative network by another mobile device.

5. The apparatus of claim 1, wherein the characteristic of the environment includes one of a lighting condition, a sound and an atmospheric pressure.

6. The apparatus of claim 1, wherein the estimation logic to determine the first estimate of the first position includes the estimation logic to estimate elevation motion of the mobile device.

7. The apparatus of claim 1, wherein the course mapper logic to provide the course information includes the course mapper logic to provide timestamp information for one of the multiple estimates, the timestamp information for inclusion in the representation of the determined sequence.

8. A system comprising:
a navigation unit including:
context processor logic comprising circuitry configured to determine context data indicating a traversal of a course by a mobile device, the context data other than any data that specifies a position in a geodetic coordinate system, wherein the context data includes:
reference context data provided to the navigation unit via a collaborative network, wherein the reference context data describes a characteristic of an environment distinct from the mobile device, the environment including a position of the course; and
other context data based on a detection of the characteristic of the environment during the traversal with a sensor of the mobile device;
estimation logic comprising circuitry configured to determine, in response to the traversal, a sequence of multiple estimates each for a respective position of the mobile device on the course, wherein the estimation logic to determine the sequence includes the estimation logic to perform a comparison of the reference context data to the other context data and, based on the comparison, to determine a first estimate of a first position of the mobile device; and
course mapper logic to provide course information; and
a display to provide a map including a representation of the determined sequence.

9. The system of claim 8, wherein the estimation logic to determine the sequence of multiple estimates is in response to an unavailability of a satellite navigation resource.

10. The system of claim 8, wherein the context data is based at least in part on a signal from an inertial sensor of the mobile device.

11. The system of claim 8, wherein the reference context data is provided via the collaborative network by another mobile device.

12. The system of claim 8, wherein the characteristic of the environment includes one of a lighting condition, a sound and an atmospheric pressure.

13. The system of claim 8, wherein the estimation logic to determine the first estimate of the first position includes the estimation logic to estimate elevation motion of the mobile device.

14. The system of claim 8, wherein the course mapper logic to provide the course information includes the course mapper logic to provide timestamp information for one of the multiple estimates, the timestamp information for inclusion in the representation of the determined sequence.

15. A method comprising:
with a processor and a memory, determining context data indicating a traversal of a course by a device, the context data other than any data that specifies a position in a geodetic coordinate system, wherein the context data includes:
reference context data provided to the device via a collaborative network, wherein the reference context data describes a characteristic of an environment distinct from the device, the environment including a position of the course; and
other context data based on a detection of the characteristic of the environment during the traversal with a sensor of the device;
in response to the traversal, determining with the processor and the memory a sequence of multiple estimates each for a respective position of the device on the course, the determining the sequence including comparing the reference context data to the other context data and, based on the comparing, determining a first estimate of a first position of the device; and
providing course information to represent the determined sequence in a display of the device.

16. The method of claim 15, wherein the determining the sequence of multiple estimates is in response to detecting an unavailability of a satellite navigation resource.

17. The method of claim 15, wherein the context data is based at least in part on a signal from an inertial sensor of the device.

18. The method of claim 15, wherein the reference context data is provided via the collaborative network by a mobile device other than the device.

19. The method of claim 15, wherein the characteristic of the environment includes one of a lighting condition, a sound and an atmospheric pressure.

20. The method of claim 15, wherein determining the first estimate of the first position includes estimating elevation motion of the device.

21. The method of claim 15, wherein providing the course information includes providing timestamp information for one of the multiple estimates, the timestamp information for inclusion in the representation of the determined sequence.

22. A non-transitory computer-readable storage medium having stored thereon instructions which, when executed by one or more processing units, cause the one or more processing units to perform a method comprising:
determining context data indicating a traversal of a course by a device, the context data other than any data that specifies a position in a geodetic coordinate system, wherein the context data includes:
reference context data provided to the device via a collaborative network, wherein the reference context data describes a characteristic of an environment distinct from the device, the environment including a position of the course; and other context data based on a detection of the characteristic of the environment during the traversal with a sensor of the device;

in response to the traversal, determining a sequence of multiple estimates each for a respective position of the device on the course, the determining the sequence including comparing the reference context data to the other context data and, based on the comparing, determining a first estimate of a first position of the device; and providing course information to represent the determined sequence in a display of the device.

23. The computer-readable storage medium of claim 22, wherein the determining the sequence of multiple estimates is in response to detecting an unavailability of a satellite navigation resource.

24. The computer-readable storage medium of claim 22, wherein the context data is based at least in part on a signal from an inertial sensor of the device.

25. The computer-readable storage medium of claim 22, wherein the reference context data is provided via the collaborative network by a mobile device other than the device.

26. The computer-readable storage medium of claim 22, wherein determining the first estimate of the first position includes estimating elevation motion of the device.

* * * * *